United States Patent
Diachina et al.

(10) Patent No.: US 9,380,502 B2
(45) Date of Patent: Jun. 28, 2016

(54) DETERMINING THE NEED FOR A ROUTING AREA UPDATE FOR PACKET SWITCHED HANDOVER IN MULTI-OPERATOR CORE NETWORK

(71) Applicant: Telefonaktiebolaget L M Ericsson (publ), Stockholm (SE)

(72) Inventors: John Walter Diachina, Garner, NC (US); Paul Schliwa-Bertling, Ljungsbro (SE); Magnus Karlsson, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 121 days.

(21) Appl. No.: 14/095,828

(22) Filed: Dec. 3, 2013

(65) Prior Publication Data

US 2014/0153542 A1    Jun. 5, 2014

Related U.S. Application Data

(60) Provisional application No. 61/733,625, filed on Dec. 5, 2012.

(51) Int. Cl.
| | | |
|---|---|---|
| *H04W 36/00* | (2009.01) | |
| *H04W 36/12* | (2009.01) | |
| *H04W 36/14* | (2009.01) | |

(52) U.S. Cl.
CPC ...... *H04W 36/0061* (2013.01); *H04W 36/0022* (2013.01); *H04W 36/12* (2013.01); *H04W 36/14* (2013.01)

(58) Field of Classification Search
CPC ............. H04W 36/0061; H04W 36/0022; H04W 36/12; H04W 36/14
USPC ........... 370/310, 328, 329, 331, 351, 389, 370/395.1, 395.2, 395.3, 395.31; 455/403, 455/422.1, 436, 438, 439, 440
See application file for complete search history.

(56) References Cited

U.S. PATENT DOCUMENTS

2009/0049154 A1* 2/2009 Ge ................................ 709/217
2009/0086672 A1* 4/2009 Gholmieh et al. ............ 370/329
(Continued)

OTHER PUBLICATIONS

"3rd Generation Partnership Project; Technical Specification Group GSM/EDGE Radio Acces Network; General Packet Radio Service (GPRS); Mobile Station (MS) Base Station System interface; Radio Link Control/Medium Access Control (Release 11)", vol. GERAN WG2, No. V11.2.1, Sep. 28, 2012; pp. 1-627.
(Continued)

*Primary Examiner* — Obaidul Huq
(74) *Attorney, Agent, or Firm* — Nicholson, De Vos, Webster & Elliot, LLP

(57) ABSTRACT

A method implemented by a MS for controlling handover of the MS from a source cell of a source RAN operating in PS domain to a target cell of a target RAN operating in PS domain where the target RAN supports MOCN. The method includes receiving SI transmitted by a node of the source RAN. The SI includes a selected PLMN, LAC of the target cell, and RAC of the target cell. The MS executes handover to the target RAN. A target RAI is determined using the selected PLMN, LAC of the target cell, and RAC of the target cell from the SI transmitted by the node of the source RAN. The target RAI is compared to a registered RAI of the MS. The MS determines whether a RAU is needed in the target RAN based on the comparison of the target RAI to the registered RAI.

20 Claims, 6 Drawing Sheets

(56) References Cited

U.S. PATENT DOCUMENTS

2012/0218889 A1* 8/2012 Watfa et al. .................. 370/230
2013/0303114 A1* 11/2013 Ahmad et al. ................ 455/406
2014/0094174 A1 4/2014 Diachina et al.

OTHER PUBLICATIONS

"3rd Generation Partnership Project; Technical Specification Group GSM/EDGE Radio Access Network; Mobile radio interface layer 3 specification; Radio Resource Control (RRC) protocol (Release 11)", vol. GERAN WG2, No. V11.2.0, Sep. 21, 2012; pp. 1-458.

"3rd Generation Partnership Project; Technical Specification Group Services and System Aspects; Network Sharing; Architecture and functional description (Release 11)", vol. SA WG2, No. V11.3.0; Sep. 11, 2012, pp. 1-30.

Ericsson, et al., "Indicating selected PLMN to target BSC during handover", vol. SA WG2, no. New Orleans, USA; Nov. 16, 2012; XP050684350; Sections 5.2b, 5.3 and 5.4; pp. 1,2.

Ericsson, et al., "Indicating selected PLMN to target BSC during handover", vol. SA WG2, no. Prague, Czech Republic; Jan. 22, 2013, Sections "Scenario 4" "Summary for CS and PS handover" and "Benefits from the proposal".

3GPP TS 24.008 V13.2.0 (Jun. 2015), "Mobile radio interface Layer 3 specification; Core network protocols; Stage 3," 3rd Generation Partnership Project, Technical Specification Group Core Network and Terminals, Release 13, Jun. 26, 2015.

\* cited by examiner

Figure 2 (Using Flag for CS Handover)

Figure 3 (Using Flag for PS Handover)

Figure 4 (Using SI for PS Handover)

Figure 5 (Using PACCH for PS Handover)

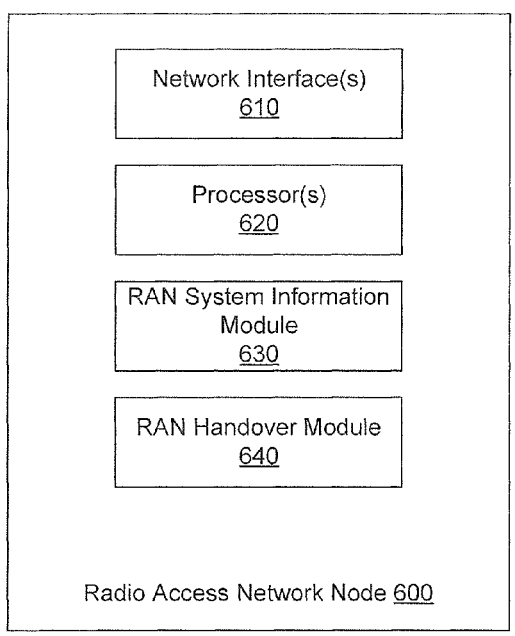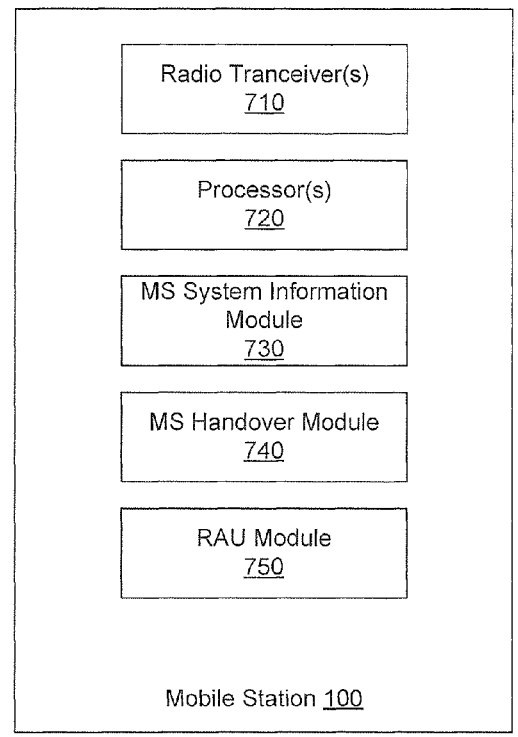
Figure 6
Figure 7

DETERMINING THE NEED FOR A ROUTING AREA UPDATE FOR PACKET SWITCHED HANDOVER IN MULTI-OPERATOR CORE NETWORK

RELATED APPLICATIONS

The present application claims the benefit of priority from U.S. Provisional Application No. 61/733,625 entitled "RAC Support for CS Handover in MOCN" filed Dec. 5, 2012, which is hereby incorporated by reference.

TECHNICAL FIELD

The present disclosure relates to radio access networks and, more particularly, to handover to a radio access network that supports a multi-operator core network.

BACKGROUND

A FULL-Multi-Operator Core Network (FULL-MOCN) features a common radio access network (RAN) that is shared by multiple Mobile Switching Centres (MSCs) and/or Serving GPRS Support Nodes (SGSNs), where each MSC and/or SGSN is associated with a different Public Land Mobile Network (PLMN). Thus, a FULL-MOCN allows multiple core network operators to share a single RAN. This is a departure from the traditional implementation where a single RAN is associated with a single operator.

When a Mobile Station (MS) leaves a source cell and enters a target cell that supports MOCN, the MS needs to execute a handover procedure. Following the handover procedure, the MS may need to communicate a routing area update (RAU) message in the target cell if a change in routing area identity (RAI) occurs. A change in RAI can occur if the PLMN that served the MS in the source cell is different from the PLMN that will serve the MS in the target cell. A change in RAI can also occur if the location area code (LAC) or routing area code (RAC) of the source cell is different from the LAC/RAC of the target cell. Although it is desirable for the MS to maintain PLMN continuity across a handover, it is not always possible. If the PLMN that serves the MS changes across handover, then a change in RAI occurs, and the MS should communicate a RAU upon completion of the handover. However, if the RAI does not change across the handover (i.e., PLMN continuity is maintained across the handover and the LAC/RAC of the target cell is the same as the LAC/RAC of the source cell), then a RAU is unnecessary.

With the increase in popularity of mobile devices, it is important that handover of a MS from a source cell to a target cell is performed seamlessly and efficiently in a FULL-MOCN environment. The introduction of FULL-MOCN presents a shift in network implementation that can affect various operations of the network including handover and RAU procedures.

SUMMARY

A method is described to be implemented by a node in a source RAN to control handover of a MS from a source cell of a source RAN operating in PS domain to a target cell of a target RAN operating in PS domain where the target RAN supports MOCN. The method includes transmitting system information to the MS. The system information includes a selected PLMN, LAC of the target cell, and RAC of the target cell. The method also includes sending a PS handover command to the MS.

A method is described to be implemented by a MS to control handover of the MS from a source cell of a source RAN operating in PS domain to a target cell of a target RAN operating in PS domain where the target cell supports MOCN. The method includes receiving system information transmitted by a node of the source RAN. The system information includes a selected PLMN, LAC of the target cell, and RAC of the target cell. The MS executes handover to the target RAN. A target RAI is determined using the selected PLMN, LAC of the target cell, and RAC of the target cell from the system information transmitted by the node of the source RAN. The target RAI is compared to a registered RAI of the MS. The MS determines whether a RAU is needed in the target RAN based on the comparison of the target RAI to the registered RAI.

A node of a source RAN is described to control handover of a MS from a source cell of the source RAN operating in PS domain to a target cell of a target RAN operating in PS domain where the target RAN supports MOCN. The node comprising a processor, a RAN system information module, and a RAN handover module. The RAN system information module is configured to transmit system information to the MS. The system information includes a selected PLMN, LAC of the target cell, and RAC of the target cell. The RAN handover module is configured to send a PS handover command to the MS.

A MS is described that is configured for handover from a source cell of a source RAN operating in PS domain to a target cell of a target RAN operating in PS domain where the target RAN supports MOCN. The MS comprising a processor, a MS system information module, a MS handover module, and a RAU module. The MS system information module is configured to receive system information transmitted by a node of the source RAN including a selected PLMN, LAC of the target cell, and RAC of the target cell. The MS handover module is configured to execute handover to the target RAN. The RAU module is configured to determine a target RAI using the selected PLMN, LAC of the target cell, and RAC of the target cell from the system information transmitted by the node of the source RAN. The RAU module is further configured to compare the target RAI to a registered RAI, and to determine whether a RAU is needed in the target RAN based on the comparison of the target RAI to the registered RAI.

BRIEF DESCRIPTION OF THE DRAWINGS

Aspects of the present disclosure are illustrated by way of example and are not limited by the accompanying drawings. In the drawings:

FIG. 6 is a block diagram of an example RAN of FIGS. 1-5 that is configured according to some embodiments; and FIG. 7 is a block diagram of an example MS of FIGS. 1-5 that is configured according to some embodiments.

DETAILED DESCRIPTION

Figure 1:
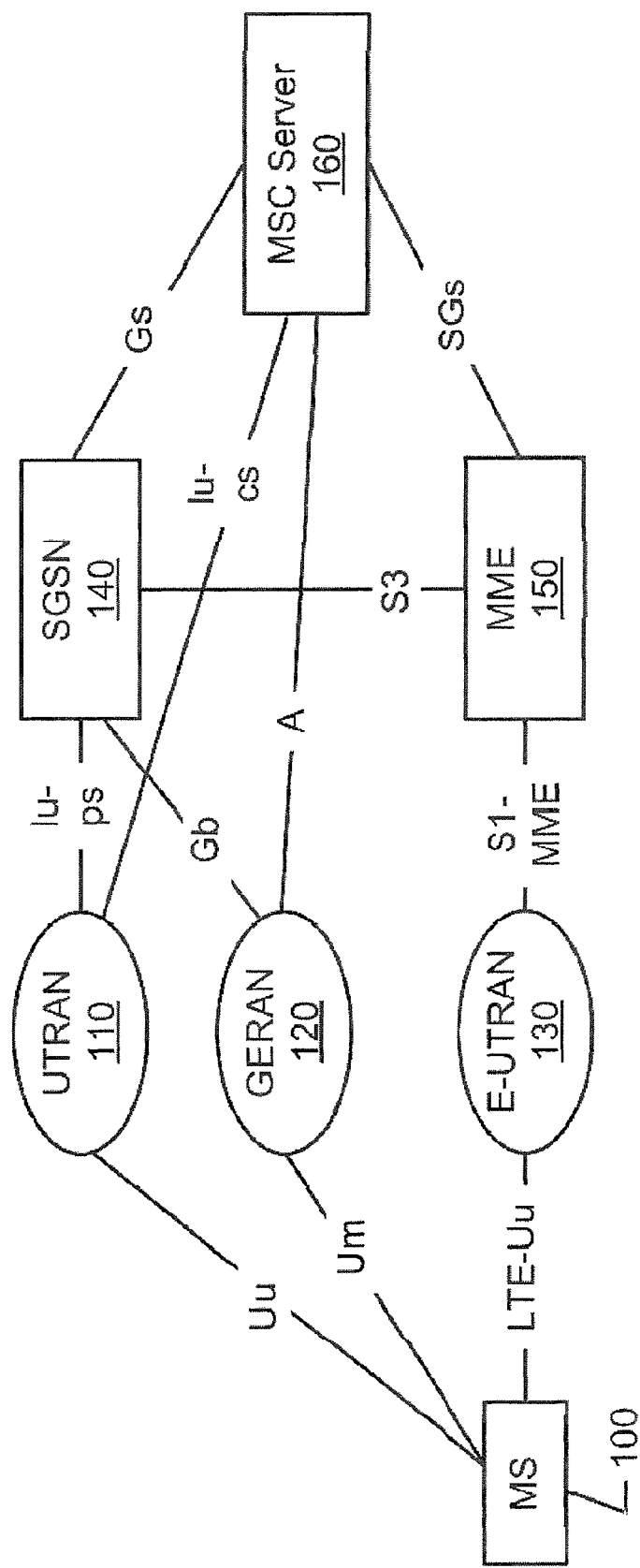
FIG. 1 is a block diagram of a radio telecommunications network that is configured to operate according to some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Other embodiments may take many different forms and should not be construed as limited to the embodiments set forth herein. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, the singular forms "a," "an," and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise," "comprising," "comprises," "include," "including," "includes," "have," "has," "having," or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.," which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, micro-code, etc.) that runs on a processor such as a digital signal processor, which may collectively be referred to as "circuitry," "a module," or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

The introduction of the FULL-Multi-Operator Core Network (FULL-MOCN) features a common radio access network (RAN, e.g. a BSS) that is shared by multiple Mobile Switching Centres (MSCs) and/or Serving GPRS Support Nodes (SGSNs), where each MSC and/or SGSN is associated with a different Public Land Mobile Network (PLMN) identified using a unique PLMN ID value. When a Mobile Station (MS) experiences handover from a source GSM cell to a target GSM cell that supports FULL-MOCN, various operational problems can occur.

When performing a circuit switched (CS) domain to CS domain handover, where the target cell supports FULL-MOCN, a change of Routing Area Identity (RAI) may occur in which case the MS is expected to perform a Routing Area Update (RAU) upon completion of the handover for the case where the MS and the target cell both support Dual Transfer Mode (DTM).

According to legacy operation, the MS will, upon completion of the handover, receive an SI6 message on the Slow Associated Control Channel (SACCH) of the traffic channel (TCH) it has been assigned to use in the target cell. The SI6 message provides information about the target cell to the MS. In particular, the SI6 message includes the common PLMN (according to legacy operation) of the target cell, the location area code (LAC) of the target cell, and the routing area code (RAC) of the target cell.

If the last successful RAU performed by the MS prior to handover to the target cell resulted in the MS being accepted for service, for example, on PLMN X in the source cell, and the target cell also supports PLMN X, then PLMN continuity will be possible across the CS handover. However, it is also possible for LAC and RAC to change across CS handover, regardless of whether or not the source cell and the target cell support the same set of PLMNs.

After completing CS handover to the target cell, the MS determines whether or not a RAU is needed by comparing the routing area identity (RAI) associated with its last successful registration performed in the source cell to the RAI of the target cell. A RAI is defined by a PLMN, LAC, and RAC. The RAI of the target cell is determined using information obtained from the SI6 (which includes the common PLMN of the target cell, LAC of the target cell, and RAC of the target cell) that the MS receives in the target cell.

The MS will determine that a RAU is needed in the target cell whenever the last registered RAI of the MS (i.e., last registered PLMN, LAC, and RAC of the source cell) is different from the RAI of the target cell (common PLMN, LAC, and RAC of the target cell). A RAU is unnecessary in the target cell if the target cell LAC/RAC are the same as the source cell LAC/RAC and the target cell serves the MS using the last registered PLMN of the MS. However, because the last registered PLMN of the MS may not be the same as the common PLMN of the target cell and the MS currently compares its last registered PLMN with the common PLMN of the target cell, a RAU may be triggered even though PLMN continuity is maintained in the target cell and the LAC/RAC of the target cell is the same as the source cell.

As a result, unnecessary RAUs may be triggered whenever the last registered PLMN of the MS is not the same as the common PLMN of the target cell. Unnecessary RAUs consume network resources and bandwidth, which may result in the target RAN providing less than optimal service. This problematic scenario is further exacerbated when considering that each successful completion of a RAU results in the Non-Access Stratum (NAS) layer being informed of the MS's registered PLMN, which can continue to be different from the common PLMN of the target cell (i.e., when the PLMN identified as a result of the RAU performed in the target cell is different from the common PLMN of the target cell). Upon each subsequent reception of SI6 (which is received periodically while an MS remains operational on a traffic channel), the MS will continue to compare the common PLMN of the target cell received in SI6 to its last registered PLMN and therefore make repeated erroneous conclusions regarding the need to perform a RAU.

A similar problem exists for packet switched (PS) domain to PS domain handover where the MS has no reliable mechanism for determining whether or not a RAU is needed upon arrival in the target cell. In the PS case, the MS currently receives the common PLMN of the target cell, the LAC of the target cell, and the RAC of the target cell in the source cell via a SI3 and SI13 message before attempting handover to the target cell. Because the SI3 and SI13 messages provide target cell information based on the common PLMN, the MS may make an erroneous conclusion regarding the need to communicate a RAU message upon arrival in the target cell because the registered PLMN of the MS might not be the same as the common PLMN of the target cell even though PLMN continuity is maintained across the handover.

As such, a mechanism is needed whereby a FULL-MOCN and Dual Transfer Mode (DTM) capable MS can accurately determine the need for communicating a RAU upon arrival in a target cell (as a result of CS handover) where FULL-MOCN and DTM are also supported in the target cell and whereby a FULL-MOCN capable MS can accurately determine the need for communicating a RAU upon arrival in a target cell (as a result of PS handover) where FULL-MOCN is also supported in the target cell.

One or more of foregoing problems may be overcome by various embodiments disclosed herein. Some embodiments are disclosed in the context of an example Third Generation Partnership Project (3GPP) radio telecommunications network shown in FIG. 1. An overview of the network of FIG. 1 is initially provided, and then various diagrams of operations according to embodiments disclosed herein are explained in the context of the network of FIG. 1. However, it should be understood that the operations of diagrams can be performed by embodiments of the invention other than those discussed with reference to FIG. 1, and the embodiments discussed with reference to FIG. 1 can perform operations different than those discussed with reference to the flow diagrams.

FIG. 1 is an embodiment of a Third Generation Partnership Project (3GPP) radio telecommunications network. The radio telecommunications network includes a set of MSs 100 (also known as user equipment nodes, wireless terminals, or mobile stations) that communicate through radio access communication links with a UMTS (Universal Mobile Telecommunications System) Terrestrial Radio Access Network (UTRAN) 110, a GSM (Global System for Mobile Communications) EDGE (Enhanced Data Rates for GSM Evolution) Radio Access Network (GERAN) 120, and/or an Evolved Universal Terrestrial Radio Access Network (E-UTRAN) 130. A 'set,' as used herein refers to any positive whole number of items including a single item. An MS 100 can be any type of mobile device including a cellular phone, tablet computer, laptop, desktop, console device or similar computing device that connects to the network via the UTRAN 110, GERAN 120 or E-UTRAN 130. Any number of MS 100 can connect to the network, for example in some embodiments thousands of MS 100 can be connected at a given time.

The UTRAN 110/GERAN 120 can include radio network controller (RNC)/base station controller (BSC) nodes to control communications through radio base station nodes providing radio access communication links to MSs 100 that are within their respective communication service cells. The E-UTRAN 130 can include radio base station nodes (eNodeBs) that can provide the combined functionality of the RNC/BSC nodes of the UTRAN 110/GERAN 120.

A set of Serving GPRS (General Packet Radio Service) Support Node(s) (SGSN) 140 (one of which is shown in FIG. 1) are responsible for the delivery of data packets from and to the MSs 100 within their geographical service area. Their tasks can include packet routing and transfer, mobility management (attach/detach and location management), logical link management, and authentication functions. The SGSNs 140 control communications connections between MSs 100 and one or more packet-based networks, and may perform other functions such as mobility management of MSs 100. Mobility Management Entities (MMEs) 150 (one of which is shown in FIG. 1) and the SGSNs 140 provide control plane functionality to enable mobility of MSs 100 between the UTRAN 110, the GERAN 120, and the E-UTRAN 130 via the S3 interface between the MMEs 150 and the SGSNs 140.

The MMEs 150 route and forward signalling packets for the E-UTRAN 130, and are responsible for EPS Connection Management (ECM) idle mode MS 100 tracking and paging procedures, and are involved in connection bearer (Packet Data Network (PDN) connection) activation/deactivation processes, for choosing a Serving Gateway (SGW) for a MS 100 at the initial attachment and at time of handover.

The Mobile Switching Centre (MSC) Servers 160 are responsible for communication switching functions such as call set-up, release, and routing. Also, the MSC servers 160 play a significant role in handling handover of a MS 100 between RANs.

Some embodiments disclosed herein are directed to modifying the CS domain to CS domain handover procedure where FULL-MOCN is supported. Some other embodiments are directed to modifying PS domain to PS domain handover procedure where FULL-MOCN is supported.

Using Flag for CS Handover

Figure 2:
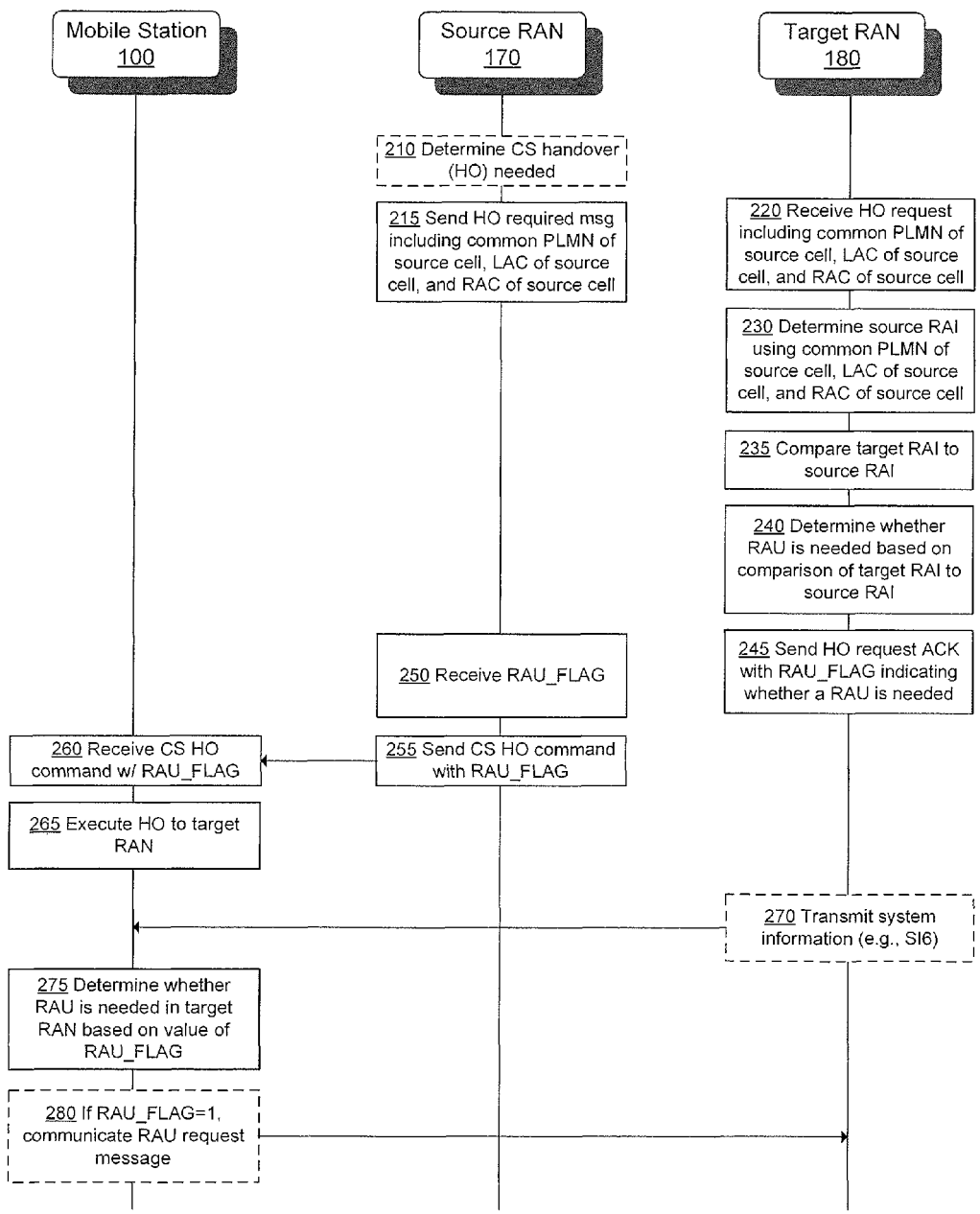
FIG. 2 illustrates a diagram of operations, methods and associated message flows between various network nodes of a radio telecommunications network for controlling handover of a MS from a source cell of a source RAN operating in a CS domain to a target cell of a target RAN operating in a CS domain using a flag according to some embodiments.

FIG. 2 illustrates a diagram of operations, methods and associated message flows between various network nodes of a radio telecommunications network for controlling handover of a MS 100 from a source cell of a source RAN 170 operating in a CS domain to a target cell of a target RAN 180 operating in a CS domain using a flag. The source RAN 170 and target RAN 180 may be a UTRAN 110, GERAN 120, or E-UTRAN 130. Other radio access technologies are contemplated as well.

Referring to FIG. 2, the MS 100 is served by the source RAN 170 during a call in the CS domain. The source RAN 170 determines that CS handover needs to be performed to the target RAN 180 (Block 210). The source RAN 170 sends a handover required message to the core network including the common PLMN of the source cell, LAC of the source cell, and the RAC of the source cell (Block 215). The common PLMN of the source cell, LAC of the source cell, and the RAC of the source cell may be sent in a source to target transparent container included with the handover required message. The handover required message may also identify a selected PLMN that will serve the MS 100 in the target cell after handover. In one embodiment, the source RAN 170 only includes the RAC of the source cell in the handover required message when it is aware that FULL-MOCN operation is supported in the target cell. The target RAN 180 receives a handover request message from the core network as a result of handover triggered by the source RAN 170 (Block 220). The handover request message includes the common PLMN of the source cell, LAC of the source cell, and the RAC of the source cell. The handover request message may also include the selected PLMN that will serve the MS 100 after handover. In one embodiment, the selected PLMN may be indicated by a target cell ID contained in the handover request message, which the target RAN 180 can be configured to use to determine the PLMN and LAC selected for service by the source RAN 170. In another embodiment, the target RAN 180 may be able to identify the selected PLMN based on the PLMN associated with the MSC server 160 from which it receives the handover request. The target RAN 180 can therefore determine the selected PLMN that has been indicated to it (either explicitly indicated by a target cell ID included in the handover request or implicitly indicated by the MSC server 160 sending the handover request) maps to one of the PLMN IDs that it is currently transmitting as part of system information (SI) in the target cell, and can generate a PLMN ID index value that corresponds to the selected PLMN. The PLMN ID index therefore identifies a selected PLMN corresponding to one of a plurality of different operators of a FULL-MOCN that is serving the MS 100.

Upon receiving the handover request message, the target RAN 180 determines the RAI of the source cell (Block 230). The RAI of the source cell is determined using the common PLMN of the source cell, LAC of the source cell, and RAC of the source cell obtained from the handover request message. The target RAN 180 then compares the RAI of the target cell to the RAI of the source cell (Block 235). The RAI of the target cell is determined using the common PLMN of the target cell, LAC of the target cell, and RAC of the target cell, which the target RAN 180 already has knowledge of. The target RAN 180 determines whether the MS 100 needs to communicate a RAU in the target cell based on the comparison of the RAI of the target cell to the RAI of the source cell (Block 240). If the RAI of the target cell is different from the RAI of the source cell, then a RAU is needed upon MS 100 arrival in the target cell. On the other hand, if the RAI of the target cell is the same as the RAI of the source cell, then a RAU is not needed in the target cell.

It is assumed that if the common PLMN based RAI of the source cell matches the common PLMN based RAI of the target cell, then regardless of the PLMN that the MS 100 is registered with in the source cell, PLMN continuity will be possible across the source cell and target cell for all supported PLMNs. Also, if the source cell and the target cell do not support the same set of PLMNs, then they will have different RAC values and LAC values. As such, even though PLMN continuity may be supported when performing handover from the source cell to the target cell, the MS 100 will still need to perform a RAU due to RAC/LAC discontinuity.

After determining whether a RAU is needed, the target RAN 180 sends a handover request acknowledgment (ACK) message to the core network for subsequent forwarding to the source RAN 170 (Block 245). The handover request ACK includes a RAU_FLAG that indicates whether the MS 100 needs to perform a RAU. The RAU_FLAG may be sent in a target to source transparent container included with the handover request ACK message. In one embodiment a RAU_FLAG value of 1 indicates that a RAU is needed and a RAU_FLAG value of 0 indicates that a RAU is not needed. In one embodiment, the target RAN 180 includes the PLMN ID index with the handover request ACK message for subsequent forwarding to the MS 100. The PLMN ID index can be embedded in the target to source transparent container included with the handover request ACK message.

Upon receiving the RAU_FLAG (Block 250), the source RAN 170 sends a CS handover command to the MS 100 that includes the RAU_FLAG (Block 255). In one embodiment, the CS handover command contains the PLMN ID index, which the MS 100 can later use to forward the RAU request message to the appropriate SGSN 140 in the target cell. The MS 100 receives the CS handover command with RAU_FLAG (Block 260) and executes handover to the target RAN 180 (Block 265). Due to the presence of the RAU_FLAG in the CS handover command, the MS 100 will realize that it should ignore the RAI included in the SI (e.g., SI6) it receives on its assigned TCH in the target cell when making a decision about whether or not a RAU is needed in the target cell. Instead, the MS 100 makes a decision about whether a RAU is needed in the target cell based on the value of the RAU_FLAG (Block 275). In one embodiment, the MS 100 determines that a RAU is needed if the RAU_FLAG value is 1.

If the MS 100 determines that a RAU is needed in the target cell, the MS 100 communicates a RAU request message in the target cell (Block 280). In one embodiment, the MS 100 only communicates a RAU request message if it supports DTM and DTM is also supported in the target cell. The target RAN 180 is then responsible for forwarding the RAU request message to the SGSN 140 associated with the selected PLMN. In one embodiment, the MS 100 may include the PLMN ID index with the RAU request message to help the target RAN 180 forward the RAU request message to the appropriate SGSN 140.

In the event of a subsequent CS handover where the MS 100 receives a RAU_FLAG in the CS handover command, the MS 100 continues to ignore the content of the SI (e.g., SI6 message received on the SACCH of its assigned TCH in the target cell) when determining whether a RAU is needed. In the case of subsequent CS handover where a RAU_FLAG is not included in the handover command, the MS 100 assumes it has been handed over to a cell that does not support FULL-MOCN and will therefore uses the RAI content of the SI (e.g., SI6 message) per legacy operation, to determine whether a RAU is needed.

Using Flag for PS Handover

Figure 3:
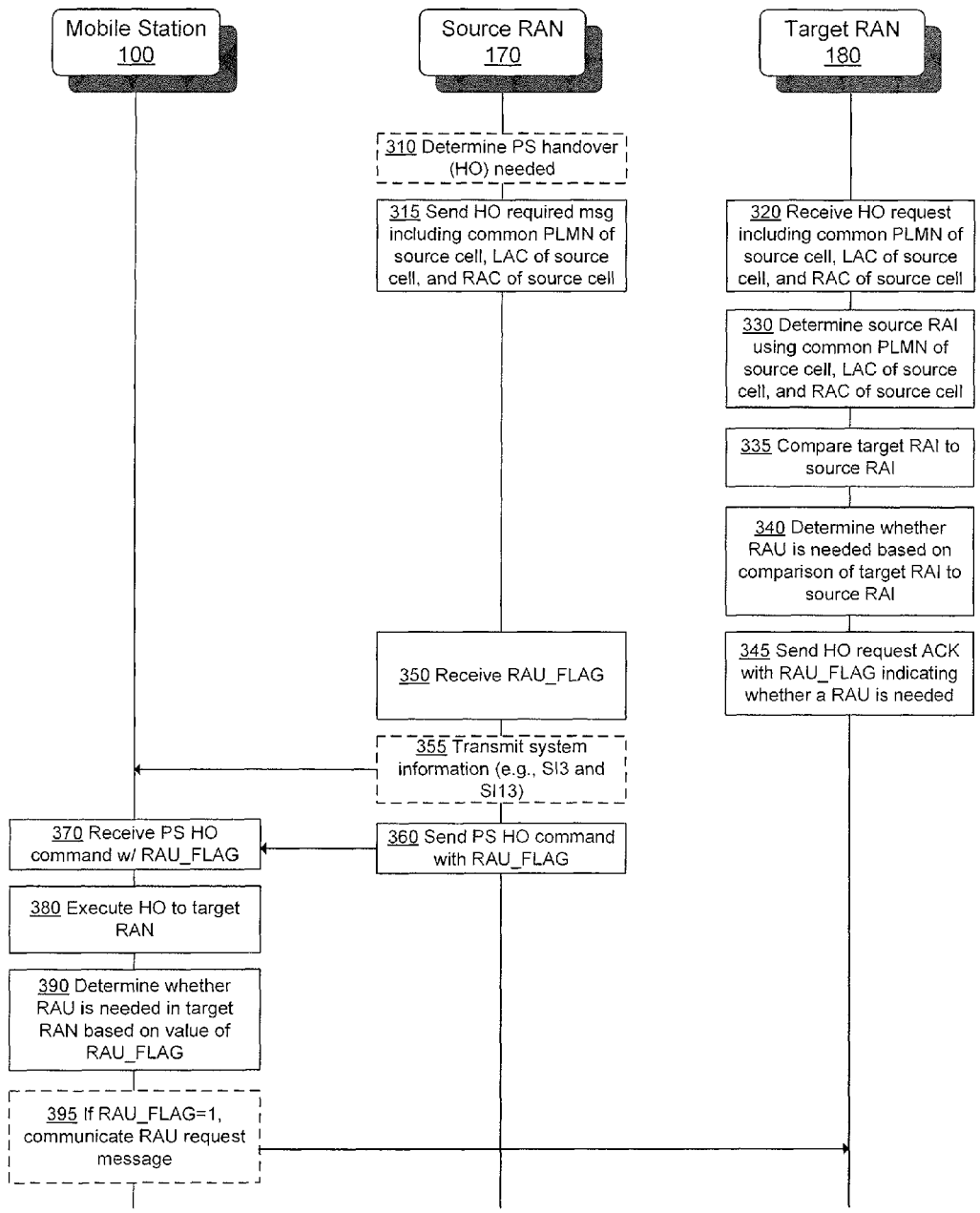
FIG. 3 illustrates a diagram of operations, methods and associated message flows between various network nodes of a radio telecommunications network for controlling handover of a MS from a source cell of a source RAN operating in a PS domain to a target cell of a target RAN operating in a PS domain using a flag according to some embodiments.

FIG. 3 illustrates a diagram of operations, methods and associated message flows between various network nodes of a radio telecommunications network for controlling handover of a MS 100 from a source cell of a source RAN 170 operating in a PS domain to a target cell of a target RAN 180 operating in a PS domain using a flag. The source RAN 170 and target RAN 180 may be a UTRAN 110, GERAN 120, or E-UTRAN 130. Other radio access technologies are contemplated as well.

Referring to FIG. 3, the MS 100 is served by the source RAN 170 during a call in the PS domain (i.e., an ongoing service in the PS domain). The source RAN 170 determines that PS handover needs to be performed to the target RAN 180 (Block 310). The source RAN 170 sends a handover required message to the core network including the common PLMN of the source cell, LAC of the source cell, and the RAC of the source cell (Block 315). The common PLMN of the source cell, LAC of the source cell, and the RAC of the source cell may be sent in a source to target transparent container included with the handover required message. The handover required message may also identify a selected PLMN that will serve the MS 100 in the target cell after handover. In one embodiment, the source RAN 170 only includes the RAC of the source cell in the handover required message when it is aware that FULL-MOCN operation is supported in the target cell. The target RAN 180 receives a handover request message from the core network as a result of handover triggered by the source RAN 170 (Block 320). The handover request message includes the common PLMN of the source cell, LAC of the source cell, and the RAC of the source cell. The handover request message may also include the selected PLMN that will serve the MS 100 in the target cell after handover. In one embodiment, the common PLMN of the source cell, the LAC of the source cell, the RAC of the source cell, and the selected PLMN are sent in a source to target transparent container included with the handover required message.

Upon receiving the handover request message, the target RAN 180 determines the RAI of the source cell (Block 330). The RAI of the source cell is determined using the common PLMN of the source cell, LAC of the source cell, and RAC of the source cell obtained from the handover request message. The target RAN 180 then compares the RAI of the target cell to the RAI of the source cell (Block 335). The RAI of the target cell is determined using the common PLMN of the target cell, LAC of the target cell, and RAC of the target cell, which the target RAN 180 already has knowledge of. The target RAN 180 determines whether the MS 100 needs to communicate a RAU in the target cell based on the comparison of the RAI of the target cell to the RAI of the source cell (Block 340). If the RAI of the target cell is different from the RAI of the source cell, then a RAU is needed upon MS 100 arrival in the target cell. On the other hand, if the RAI of the target cell is the same as the RAI of the source cell, then a RAU is not needed in the target cell.

It is assumed that if the common PLMN based RAI of the source cell matches the common PLMN based RAI of the target cell, then regardless of the PLMN that the MS 100 is registered with in the source cell, PLMN continuity will be possible across the source cell and target cell for all supported PLMNs. Also, if the source cell and the target cell do not support the same set of PLMNs, then they will have different RAC values and LAC values. As such, even though PLMN continuity may be supported when performing handover from the source cell to the target cell, the MS 100 will still need to perform a RAU due to RAC/LAC discontinuity.

After determining whether a RAU is needed, the target RAN 180 sends a handover request acknowledgment (ACK) message to the core network for subsequent forwarding to the source RAN 170 (Block 345). The handover request ACK includes a RAU_FLAG that indicates whether the MS 100 needs to perform a RAU. The RAU_FLAG may be sent in a target to source transparent container included with the handover request ACK message. In one embodiment a RAU_FLAG value of 1 indicates that a RAU is needed and a RAU_FLAG value of 0 indicates that a RAU is not needed.

The source RAN 170 receives the RAU_FLAG (Block 350) and transmits system information to the MS 100 (Block 355). After the source RAN 170 transmits system information to the MS 100, the source RAN 170 sends a PS handover command to the MS 100 including the RAU_FLAG (Block 360). The MS 100 receives the PS handover command with RAU_FLAG (Block 370) and executes handover to the target RAN 180 (Block 380). Due to the presence of the RAU_FLAG in the PS handover command, the MS 100 will realize that it should ignore the RAI included in the SI (e.g., SI3 and SI13) it received in the source cell when making a decision about whether a RAU is needed in the target cell. Instead, the MS 100 makes a decision about whether a RAU is needed in the target cell based on the value of the RAU_FLAG (Block 390). In one embodiment, the MS 100 determines that a RAU is needed if the RAU_FLAG value is 1.

In one embodiment, if the MS 100 determines that a RAU is needed in the target cell, the MS 100 communicates a RAU request message in the target cell (Block 395). The target RAN 180 is then responsible for forwarding the RAU request message to the SGSN 140 associated with the selected PLMN. A PLMN ID index, as previously described in the CS Flag Handover scenario, can be used to help the target RAN 180 forward the RAU request message to the appropriate SGSN 140.

In the event of a subsequent PS handover where the MS 100 receives a RAU_FLAG in the PS handover command, the MS 100 continues to ignore the content of the SI (e.g., SI3 and SI13) received in the source cell when determining whether a RAU is needed upon arrival in the target cell. In the case of subsequent PS handover where a RAU_FLAG is not included in the handover command, the MS 100 assumes it has been handed over to a cell that does not support FULL-MOCN and will therefore use the RAI content of the SI received in the source cell (per legacy operation) to determine whether a RAU is needed.

Using System Information for PS Handover

Figure 4:
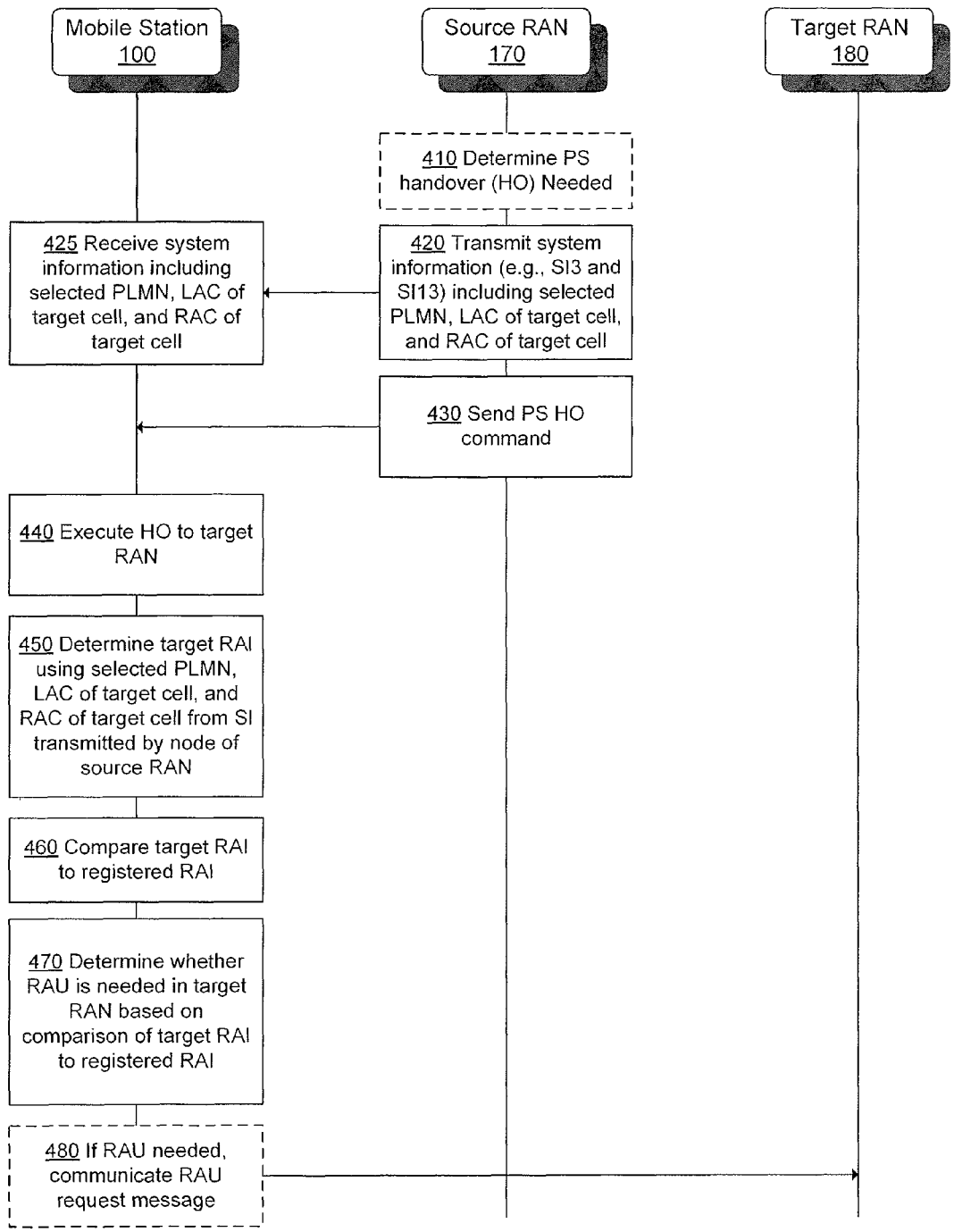
FIG. 4 illustrates a diagram of operations, methods and associated message flows between various network nodes of a radio telecommunications network for controlling handover of a MS from a source cell of a source RAN operating in a PS domain to a target cell of a target RAN operating in a PS domain using system information according to some embodiments.

FIG. 4 illustrates a diagram of operations, methods and associated message flows between various network nodes of a radio telecommunications network for controlling handover of a MS 100 from a source cell of a source RAN 170 operating in a PS domain to a target cell of a target RAN 180 operating in a PS domain using system information (SI). The source RAN 170 and target RAN 180 may be a UTRAN 110, GERAN 120, or E-UTRAN 130. Other radio access technologies are contemplated as well.

Referring to FIG. 4, the MS 100 is served by the source RAN 170 during a call in the PS domain (i.e., an ongoing service in the PS domain). The source RAN 170 determines that PS handover needs to be performed to the target RAN 180 (Block 410). In one embodiment, the source RAN 170 initiates the handover process by sending a handover required message to the core network identifying a selected PLMN that will serve the MS 100 in the target cell after handover.

Prior to sending a PS handover command to the MS 100, the source RAN 170 transmits SI to the MS 100 providing the MS 100 with information about the target cell (Block 420). In one embodiment, a base station controller (BSC) of the source RAN 170 transmits the SI to the MS 100. The SI includes the selected PLMN (instead of the common PLMN included according to legacy operation), LAC of the target cell, and RAC of the target cell. In one embodiment, the selected PLMN and the LAC of the target cell are transmitted in a SI3 message on the Packet Associated Control Channel (PACCH) of the source RAN 170 and the RAC of the target cell is transmitted in a SI13 message on the PACCH of the source RAN 170. System information pertaining to the target cell may also be transmitted in other types of messages, such as a SI1 message on the PACCH.

The MS 100 receives the SI transmitted from the source RAN 170 that includes the selected PLMN, LAC of the target cell, and RAC of the target cell (Block 425). After transmitting the SI, the source RAN 170 sends a PS handover command to the MS 100 (Block 430) and the MS 100 executes handover to the target RAN 180 (Block 440).

Upon completion of handover to the target RAN 180, the MS 100 determines the RAI of the target cell (Block 450). The RAI of the target cell is determined using the selected PLMN, LAC of the target cell, and RAC of the target cell received from the SI in the source cell. The MS 100 then compares the RAI of the target cell to its currently registered RAI (i.e., RAI associated with the registered PLMN of the MS 100 in the source cell) (Block 460). The currently registered RAI of the MS 100 is determined using the registered PLMN of the MS 100, LAC of the source cell, and RAC of the source cell. The MS 100 determines whether a RAU is needed in the target cell based on the comparison of the target RAI to the currently registered RAI of the MS 100 (Block 470). If the RAI of the target cell is different from the currently registered RAI of the MS 100, then a RAU is needed upon MS 100 arrival in the target cell. On the other hand, if the RAI of the target cell is the same as the registered RAI of the MS 100, then a RAU is not needed in the target cell.

In one embodiment, if the MS 100 determines that a RAU is needed in the target cell, the MS 100 communicates a RAU request message in the target cell (Block 480). The target RAN 180 is then responsible for forwarding the RAU request message to the SGSN 140 associated with the selected PLMN. A PLMN ID index, as previously described in the CS Flag Handover scenario, can be used to help the target RAN 180 forward the RAU request message to the appropriate SGSN 140.

Using PACCH for PS Handover

Figure 5:
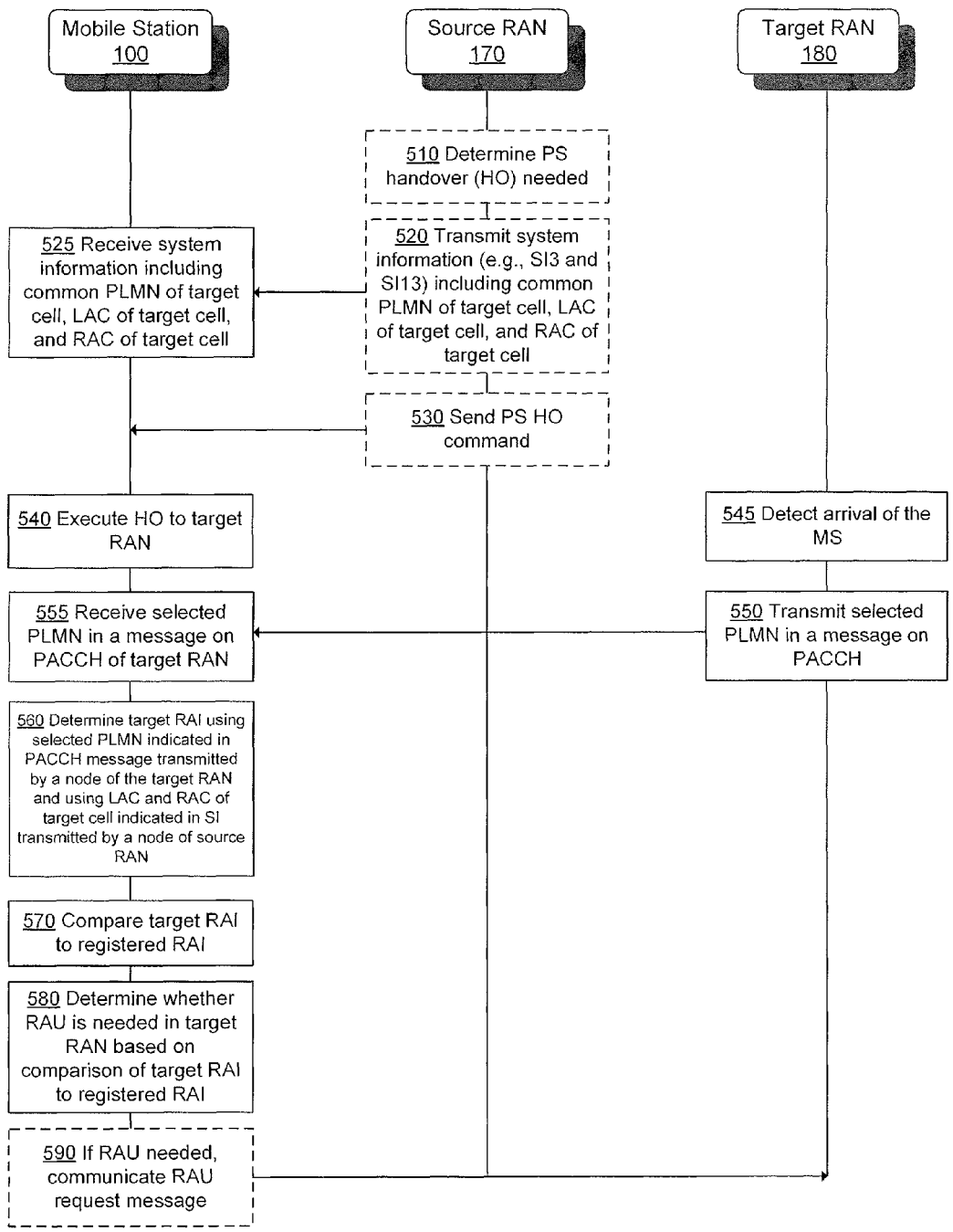
FIG. 5 illustrates a diagram of operations, methods and associated message flows between various network nodes of a radio telecommunications network for controlling handover of a MS from a source cell of a source RAN operating in a PS domain to a target cell of a target RAN operating in a PS domain using a message on the PACCH according to some embodiments.

FIG. 5 illustrates a diagram of operations, methods and associated message flows between various network nodes of a radio telecommunications network for controlling handover of a MS 100 from a source cell of a source RAN 170 operating in a PS domain to a target cell of a target RAN 180 operating in a PS domain using a message on the PACCH. The source RAN 170 and target RAN 180 may be a UTRAN 110, GERAN 120, or E-UTRAN 130. Other radio access technologies are contemplated as well.

Referring to FIG. 5, the MS 100 is served by the source RAN 170 during a call in the PS domain (i.e., an ongoing service in the PS domain). The source RAN 170 determines that PS handover needs to be performed to the target RAN 180 (Block 510). In one embodiment, the source RAN 170 initiates the handover process by sending a handover required message to the core network identifying a selected PLMN that will serve the MS 100 in the target cell after handover.

Prior to sending a PS handover command to the MS 100, the source RAN 170 transmits system information (SI) to the MS 100 providing the MS 100 with information about the target cell (Block 520). In one embodiment, a base station controller (BSC) of the source RAN 170 transmits the SI to the MS 100. The SI includes the common PLMN (according to legacy operation) of the target cell, LAC of the target cell, and RAC of the target cell. In one embodiment, the common PLMN and the LAC of the target cell is transmitted in a SI3 message on the PACCH of the source RAN 170 and the RAC of the target cell is transmitted in a SI13 message on the PACCH of the source RAN 170. System information pertaining to the target cell may also be transmitted in other types of messages, such as a SI1 message on the PACCH.

The MS 100 receives the SI transmitted from the source RAN 170 that includes the common PLMN, LAC of the target cell, and RAC of the target cell (Block 525). After transmitting the SI, the source RAN 170 sends a PS handover command to the MS 100 (Block 530) and the MS 100 executes handover to the target RAN 180 (Block 540).

Upon completion of handover to the target RAN 180, the target RAN 180 detects the arrival of the MS 100 (Block 545) and transmits the selected PLMN to the MS 100 in a message on the PACCH (Block 550). The MS 100 receives the selected PLMN from the message on the PACCH (Block 555) and uses it to determine the RAI of the target cell (Block 560). The RAI of the target cell is determined using the selected PLMN indicated in the message on the PACCH transmitted by the target RAN 180, and using the LAC and RAC of the target cell indicated in the SI transmitted by the source RAN 170. In one embodiment, the MS 100 knows that it should use the selected PLMN indicated in the message on the PACCH in the target cell and not the PLMN received from the SI3 message in the source cell because the MOCN capable MS 100 knows that upon arriving in the target cell it will get a PACCH message if the target cell supports MOCN. In another embodiment, the MS 100 knows that it should use the selected PLMN indicated in the message on the PACCH in the target cell and not the PLMN received from the SI3 message in the source cell because the PS handover command has a flag that indicates to the MS that the target cell supports FULL-MOCN and as such, the MS 100 should wait for the PACCH message upon arriving in the target cell. The MS 100 then compares the RAI of the target cell to its currently registered RAI (i.e., RAI associated with the registered PLMN of the MS 100 in the source cell) (Block 570). The currently registered RAI of the MS 100 is determined using the registered PLMN of the MS 100, LAC of the source cell, and RAC of the source cell. The MS 100 determines whether a RAU is needed in the target cell based on the comparison of the target RAI to the currently registered RAI of the MS 100 (Block 580). If the RAI of the target cell is different from the currently registered RAI of the MS 100, then a RAU is needed upon MS 100 arrival in the target cell. On the other hand, if the RAI of the target cell is the same as the registered RAI of the MS 100, then a RAU is not needed in the target cell.

In one embodiment, if the MS 100 determines that a RAU is needed in the target cell, the MS 100 communicates a RAU request message in the target cell (Block 590). The target RAN 180 is then responsible for forwarding the RAU request message to the SGSN 140 associated with the selected PLMN. A PLMN ID index, as previously described in the CS Flag Handover scenario, can be used to help the target RAN 180 forward the RAU request message to the appropriate SGSN 140.

Example Radio Access Network Node and Mobile Station

FIG. 6 is a block diagram of a RAN node 600 that is configured according to some embodiments. The RAN node 600 may be used as one or more of the elements of FIGS. 1-5, including, but not limited, to the UTRAN 110, GERAN 120, E-UTRAN 130, source RAN 170 and the target RAN 180. The RAN node 600 can include one or more network interfaces 610, processor circuitry ("processor") 620, RAN System Information Module 630, and RAN Handover Module 640.

The processor 620 may include one or more data processing circuits, such as a general purpose and/or special purpose processor (e.g., microprocessor and/or digital signal processor) that may be collocated or distributed across one or more networks. The processor 620 is configured to execute RAN System Information Module 630 and RAN Handover Module 640, to perform some or all of the operations and methods that are described above for one or more of the embodiments, such as the embodiments of FIGS. 1-5.

RAN System Information Module 630 can be executed by the processor 620 to transmit system information to an MS 100. The system information can include various information about a source cell or a target cell. For example, system information can include a selected PLMN, common PLMN, LAC, and RAC of a source cell or target cell.

RAN Handover Module 640 can be executed by the processor 620 to initiate handover for a MS 100 and send a handover command to the MS 100.

Accordingly, the processor 620 can be configured by execution of modules to carry out at least some of the functionality disclosed herein to control CS domain handover using flag, PS domain handover using flag, PS domain handover using SI, and PS domain handover using PACCH.

FIG. 7 is a block diagram of a MS 100 that is configured according to some embodiments. The MS 100 may be used as the MS 100 of FIGS. 1-5. The MS 100 can include one or more radio transceivers 710, processor circuitry ("processor") 720, MS System Information Module 730, MS Handover Module 740, and RAU Module 750.

The processor 720 may include one or more data processing circuits, such as a general purpose and/or special purpose processor (e.g., microprocessor and/or digital signal processor) that may be collocated or distributed across one or more networks. The processor 720 is configured to execute MS System Information Module 730, MS Handover Module 740, and RAU Module 750, to perform some or all of the operations and methods that are described above for one or more of the embodiments, such as the embodiments of FIGS. 1-5.

MS System Information Module 730 can be executed by the processor 720 to receive system information transmitted by a RAN. The system information can include various information about a source cell or a target cell. For example, system information can include a selected PLMN, common PLMN, LAC, and RAC of a source cell or target cell.

MS Handover Module 740 can be executed by the processor 720 to execute handover of the MS 100 from a source RAN 170 to a target RAN 180.

RAU Module 750 can be executed by the processor 720 to determine a RAI of a cell. The RAU Module 750 may also be configured to compare RAIs and to determine whether a RAU is needed in a cell based on the comparison of RAIs.

Accordingly, the processor 720 can be configured by execution of modules to carry out at least some of the functionality disclosed herein to control CS domain handover using flag, PS domain handover using flag, PS domain handover using SI, and PS domain handover using PACCH.

Thus, a method, system, and apparatus for controlling handover of a MS 100 from a source cell of a source RAN 170 to a target cell of a target RAN 180 is described through which it is possible to accurately determine the need for a RAU. While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting. Many variations and modifications can be made to the embodiments without substantially departing from the principles of the present invention. All such variations and modifications are intended to be included herein within the scope of the present invention.

The invention claimed is:

1. A method implemented by a node in a source Radio Access Network (RAN) to control handover of a mobile station (MS) from a source cell of the source RAN operating in packet switched (PS) domain to a target cell of a target RAN operating in PS domain, the target RAN supporting multi-operator core network (MOCN), the method comprising the steps of:

transmitting system information about the target cell for handover by the node to the MS, the system information including a selected public land mobile network (PLMN), location area code (LAC) of the target cell, and routing area code (RAC) of the target cell; and sending a PS handover command to the MS, wherein the selected PLMN and the LAC of the target cell is transmitted in a system information 3 (SI3) message sent on a Packet Associated Control Channel (PACCH).

2. The method of claim 1, wherein the RAC of the target cell is transmitted in a system information 13 (SI13) message sent on a Packet Associated Control Channel (PACCH).

3. The method of claim 1, wherein the node is a base station controller (BSC) of the source RAN.

4. The method of claim 1, wherein the selected PLMN is a PLMN that is managed by one of a plurality of different operators of the MOCN supported in the target cell.

5. A method by a mobile station (MS) for controlling handover of the MS from a source cell of a source Radio Access Network (RAN) operating in packet switched (PS) domain to a target cell of a target RAN operating in PS domain, the target cell supporting multi-operator core network (MOCN), the method comprising the steps of:

receiving system information transmitted by a node of the source RAN including a selected public land mobile network (PLMN), location area code (LAC) of the target cell, and routing area code (RAC) of the target cell;

executing handover to the target RAN;

determining a target routing area identity (RAI) using the selected PLMN, LAC of the target cell, and RAC of the target cell from the system information transmitted by the node of the source RAN;

comparing the target routing area identity (RAI) to a registered RAI; and determining whether a routing area update (RAU) is needed in the target RAN based on the comparison of the target RAI to the registered RAI.

6. The method of claim 5, wherein the selected PLMN and the LAC of the target cell are received in a system information 3 (SI3) message sent on a Packet Associated Control Channel (PACCH).

7. The method of claim 5, wherein the RAC of the target cell is received in a system information 13 (SI13) message sent on a Packet Associated Control Channel (PACCH).

8. The method of claim 5, wherein the selected PLMN is a PLMN that is managed by one of a plurality of different operators of the MOCN supported in the target cell.

9. The method of claim 5 further comprising:

communicating a RAU request message towards the target RAN in response to determining that a RAU is needed in the target RAN.

10. The method of claim 5, wherein the registered RAI is determined using a LAC of the source cell, a RAC of the source cell, and a registered PLMN of the MS.

11. A node of a source radio access network (RAN) for controlling handover of a mobile station (MS) from a source cell of the source RAN operating in packet switched (PS) domain to a target cell of a target RAN operating in PS domain, the target RAN supporting multi-operator core network (MOCN), comprising:

a processor;

a RAN system information module executed by the processor to transmit system information to the MS, the system information about the target cell for handover including a selected public land mobile network (PLMN), location area code (LAC) of the target cell, and routing area code (RAC) of the target cell; and a RAN handover module executed by the processor to send a PS handover command to the MS, wherein the selected PLMN and the LAC of the target cell is transmitted in a system information 3 (SI3) message sent on a Packet Associated Control Channel (PACCH).

12. The node of claim 11, wherein the RAC of the target cell is transmitted in a system information 13 (SI13) message sent on a Packet Associated Control Channel (PACCH).

13. The node of claim 11, wherein the selected PLMN is a PLMN that is managed by one of a plurality of different operators of the MOCN supported in the target cell.

14. The node of claim 11, wherein the node is a base station controller (BSC) of the source RAN.

15. A mobile station (MS) configured for handover from a source cell of a source radio access network (RAN) operating in packet switched (PS) domain to a target cell of a target RAN operating in PS domain, the target RAN supporting multi-operator core network (MOCN), comprising:

a processor;

a MS system information module executed by the processor to receive system information transmitted by a node of the source RAN including a selected public land mobile network (PLMN), location area code (LAC) of the target cell, and routing area code (RAC) of the target cell;

a MS handover module executed by the processor to execute handover to the target RAN;

a routing area update (RAU) module executed by the processor to determine a target routing area identity (RAI) using the selected PLMN, LAC of the target cell, and RAC of the target cell from the system information transmitted by the node of the source RAN, the RAU module further configured to compare the target routing area identity (RAI) to a registered RAI, and to determine whether a routing area update (RAU) is needed in the target RAN based on the comparison of the target RAI to the registered RAI.

16. The MS of claim 15, wherein the selected PLMN and the LAC of the target cell are received in a system information 3 (SI3) message sent on a Packet Associated Control Channel (PACCH).

17. The MS of claim 15, wherein the RAC of the target cell is received in a system information 13 (SI13) message sent on a Packet Associated Control Channel (PACCH).

18. The MS of claim 15, wherein the selected PLMN is a PLMN that is managed by one of a plurality of different operators of the MOCN supported in the target cell.

19. The MS of claim 15 wherein the RAU module is further configured to:

communicate a RAU request message toward the target RAN in response to determining that a RAU is needed in the target RAN.

20. The MS of claim 15 wherein the registered RAI is determined using a LAC of the source cell, a RAC of the source cell, and a registered PLMN of the MS.

* * * * *